(12) United States Patent
George

(10) Patent No.: US 6,278,246 B1
(45) Date of Patent: Aug. 21, 2001

(54) DYNAMIC FOCUS VOLTAGE AMPLITUDE CONTROLLER AND HIGH FREQUENCY COMPENSATION

(75) Inventor: John Barrett George, Carmel, IN (US)

(73) Assignee: Thomas Consumer Electronics, Inc., Indianapolis, IN (US)

( * ) Notice: Subject to any disclaimer, the term of this patent is extended or adjusted under 35 U.S.C. 154(b) by 0 days.

(21) Appl. No.: 09/196,073

(22) Filed: Nov. 19, 1998

(51) Int. Cl.[7] ................ G09G 1/04; H01J 29/58
(52) U.S. Cl. ............... 315/382; 315/368.21; 315/382.1
(58) Field of Search ............... 315/368.21, 368.22, 315/368.23, 368.19, 368.18, 382, 382.1, 387, 403; 348/806

(56) References Cited

U.S. PATENT DOCUMENTS

| | | | |
|---|---|---|---|
| 5,332,953 | | 7/1994 | Hartman et al. ............... 315/382 |
| 5,355,058 | * | 10/1994 | Jackson et al. ............... 315/371 |
| 5,430,358 | * | 7/1995 | George ............... 315/382 |
| 5,596,250 | * | 1/1997 | Truskalo ............... 315/371 |
| 5,633,566 | * | 5/1997 | Boettner et al. ............... 315/371 |
| 5,655,894 | * | 8/1997 | Murkami ............... 315/371 |
| 5,780,978 | * | 7/1998 | Bang ............... 315/382.1 |
| 5,831,400 | * | 11/1998 | Kim ............... 315/382.1 |
| 5,942,861 | * | 8/1999 | Bang ............... 315/382 |
| 5,981,952 | * | 11/1999 | Kashiwagi ............... 250/382 |
| 6,118,233 | * | 9/2000 | Craig et al. ............... 315/382.1 |

FOREIGN PATENT DOCUMENTS

| | | |
|---|---|---|
| 0844787 | 5/1998 | (EP) . |
| 63-208371 | 8/1988 | (JP) ............... H04N/3/26 |
| 3-91372 | 4/1991 | (JP) ............... H04N/3/26 |
| 3159417 | 9/1991 | (JP) ............... H03K/4/04 |
| 5-75886 | 3/1993 | (JP) ............... H04N/3/26 |

OTHER PUBLICATIONS

Chassis 445N/X21 Colour Monitor Service Manual, ZB1532, Salcomp Oy, PL 14, 24010 Salo, Finland, 11/93, cover and pp. 14–15.
Patent Abstracts of Japan, vol. 1995, No. 1, Feb. 28, 1995 & JP 06296239, Oct. 21, 1994.
Patent Abstracts of Japan, vol. 013, No. 350, Aug. 7, 1989 & JP 01108872, Apr. 26, 1989.
Patent Abstracts of Japan, vol. 015, No. 273, Jul. 11, 1991 & JP 03091372, Apr. 16, 1991.

* cited by examiner

*Primary Examiner*—Seungsook Ham
*Assistant Examiner*—Zakia N. Gregory
(74) *Attorney, Agent, or Firm*—Joseph S. Tripoli; Joseph J. Laks; Daniel E. Sragow

(57) ABSTRACT

A video imaging apparatus includes a cathode-ray tube including a focus electrode. A source of a first parabolic signal at a frequency related to a deflection frequency, selected from a plurality of frequencies, has an amplitude determined in accordance with the selected frequency. A control circuit has an input coupled to the source of the first parabolic signal for generating an output signal. The output signal is for maintaining the amplitude of the first parabolic signal for the plurality of deflection frequencies. An amplifier, that is responsive to the output signal, is coupled to the focus electrode for amplifying the parabolic signal to generate a dynamic focus voltage at the focus electrode.

1 Claim, 3 Drawing Sheets

DYNAMIC FOCUS VOLTAGE AMPLITUDE CONTROLLER AND HIGH FREQUENCY COMPENSATION

The invention relates to a beam landing distortion correction arrangement.

BACKGROUND

An image displayed on a cathode ray tube (CRT) may suffer from imperfections or distortions such as defocusing or nonlinearity that is incident to the scanning of the beam on the CRT. Such imperfections or distortions occur because the distance from the electron gun of the CRT to the faceplate varies markedly as the beam is deflected, for example, in the horizontal direction. Reducing the defocusing that occurs as the beam is deflected in the horizontal direction, for example, may be obtained by developing a dynamic focus voltage having a parabolic voltage component at the horizontal rate and applying the dynamic focus voltage to a focus electrode of the CRT for dynamically varying the focus voltage. It is known to derive the parabolic voltage component at the horizontal rate from an S-correction voltage developed in an S-shaping capacitor of a horizontal deflection output stage.

A television receiver, computer or monitor may have the capability of selectively displaying picture information in the same CRT using a deflection current at different horizontal scan frequencies. When displaying the picture information of a television signal defined according to a broadcasting standard, it may be more economical to utilize a horizontal deflection current at a rate of approximately 16 KHz, referred to as the $1f_H$ rate. Whereas, when displaying the picture information of a high definition television signal or a display monitor data signal, the rate of the horizontal deflection current may be equal to or greater than 32 KHz. The higher rate is referred to as $2nF_h$. The value n is equal to or greater than 1.

In the horizontal deflection circuit output stage of a video display monitor capable of operating at multi-scan rates, it is known to vary the number of in-circuit S-capacitors using switched S-capacitors. The selection of the S-capacitors is made automatically via selectable switches, in accordance with the selected horizontal deflection frequency.

When a non-switched retrace capacitor is employed, the length of the horizontal retrace interval is the same at different horizontal frequencies. As a result, the required amplitudes of the S-correction voltage at the different frequencies may be different. In a dynamic focus system, it is desirable to maintain the horizontal parabola amplitude constant during the vertical period. It is also desirable to keep the horizontal parabola amplitude constant as the horizontal frequency changes with the scan mode.

In carrying out an inventive feature, a parabolic horizontal rate voltage is developed in the S-shaping capacitor. The parabolic voltage is attenuated through a controlled variable voltage divider. The output of the voltage divider is coupled to an input of a differential amplifier that compares and adjusts the peak-to-peak amplitude of the parabolic voltage to be equal to a voltage reference. The horizontal parabola amplitude is kept constant during the vertical period by comparing the peak to peak amplitude of the parabola to the reference voltage and then the parabola amplitude is adjusted to be equal to the reference via a feedback amplifier and controlled attenuator.

In carrying out an inventive feature, a gain control loop removes unwanted low frequency pin correction modulation from the input voltage from the S capacitor. This modulation, if not removed, can disadvantageously make the horizontal dynamic focus correction too large at the center of the picture. By compensating via the gain control loop, phase error is not introduced.

A further inventive feature is that the high frequency roll off of the focus high voltage amplifier is compensated. The parabola is passed through a low pass filter with roll off similar to the amplifier. The parabola thus attenuated is set equal to the reference. The parabola signal that drives the amplifier is taken ahead of the filter. This signal is boosted at the high frequencies properly to provide a constant amplitude at the amplifier output.

A video imaging apparatus, embodying an inventive feature, includes a cathode-ray tube including a focus electrode. A source of a first parabolic signal at a frequency related to a deflection frequency, selected from a plurality of frequencies, has an amplitude determined in accordance with the selected frequency. A control circuit has an input coupled to the source of the first parabolic signal for generating an output signal. The output signal is for maintaining the amplitude of the first parabolic signal for the plurality of deflection frequencies. An amplifier, that is responsive to the output signal, is coupled to the focus electrode for amplifying the parabolic signal to generate a dynamic focus voltage at the focus electrode.

DESCRIPTION OF THE PREFERRED EMBODIMENTS

Figure 1A:
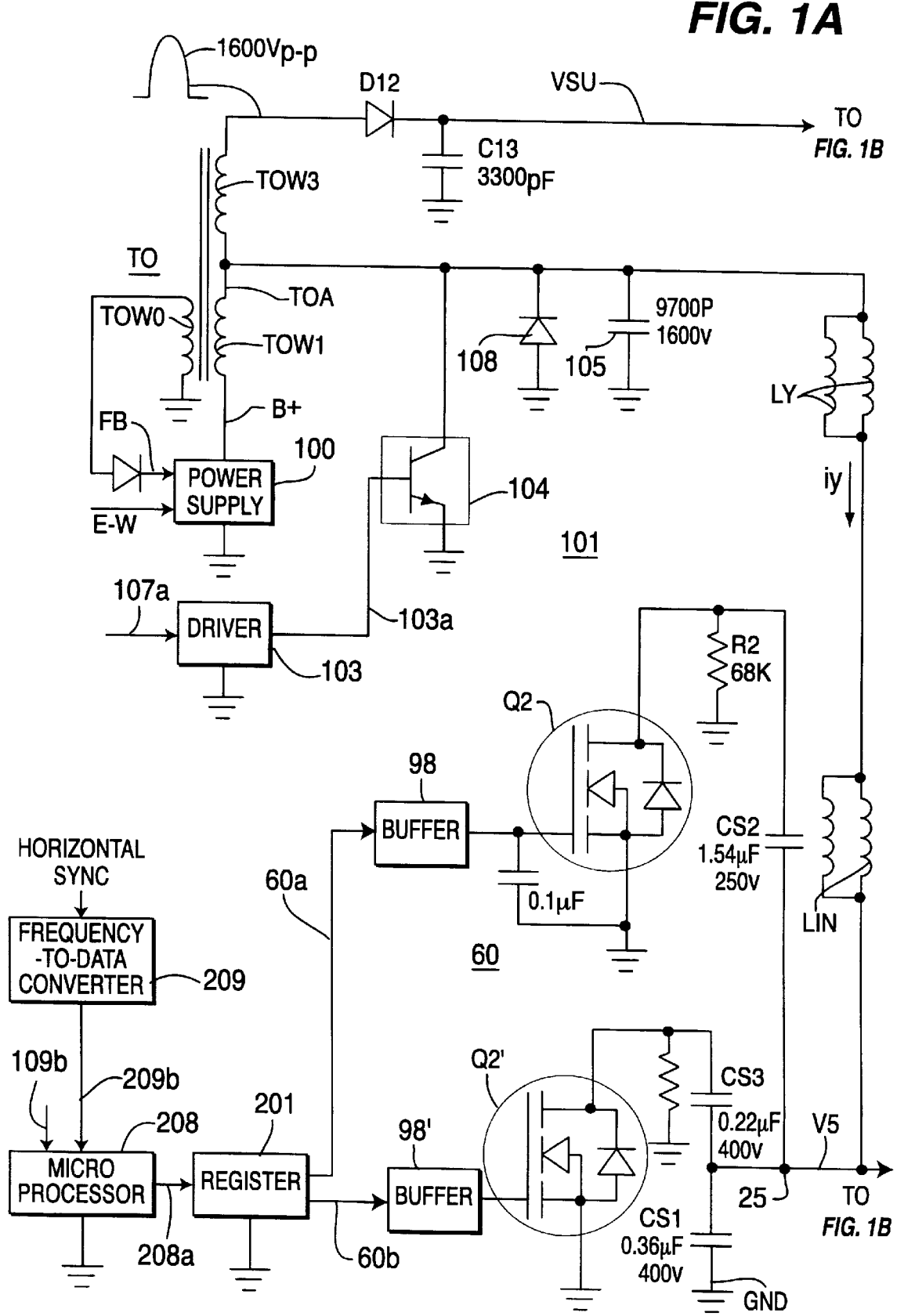
FIG. 1A illustrates a horizontal deflection circuit output stage.

FIG. 1A illustrates a horizontal deflection circuit output stage 101 of a television receiver having multi-scan frequency capability. Stage 101 is energized by a regulated power supply 100 that generates a supply voltage B+. A conventional driver stage 103 is responsive to an input signal 107a at the selected horizontal scanning frequency $nf_h$. Driver stage 103 generates a drive control signal 103a to control the switching operation in a switching transistor 104 of output stage 101. By way of example, a value of n=1 may represent the horizontal frequency of a television signal according to a given standard such as a broadcasting standard. The collector of transistor 104 is coupled to a terminal T0A of a primary winding T0W1 of a flyback transformer T0. The collector of transistor 104 is also coupled to a non-switched retrace capacitor 105. The collector of transistor 104 is additionally coupled to a horizontal deflection winding LY to form a retrace resonant circuit. The collector of transistor 104 is also coupled to a conventional damper diode 108. Winding LY is coupled in series with a linearity inductor LIN and a non-switched trace or S-capacitor CS1. Capacitor CS1 is coupled between a terminal 25 and a reference potential, or ground GND such that terminal 25 is interposed between inductor LIN and S-capacitor CS1.

Output stage 101 is capable of producing a deflection current iy. Deflection current iy has substantially the same predetermined amplitude for any selected horizontal scan frequency of signal 103a selected from a range of $2f_h$ to $2.4f_h$ and for a selected horizontal frequency of $1f_h$. Controlling the amplitude of deflection current iy is accomplished by automatically increasing voltage B+ when the horizontal frequency increases, and vice versa, so as to maintain constant amplitude of deflection current iy. Voltage B+ is controlled by a conventional regulated power supply 100 operating in a closed-loop configuration via a feedback winding T0W0 of transformer T0. The magnitude of voltage B+ is established, in accordance with a rectified, feedback flyback pulse signal FB having a magnitude that is indicative of the amplitude of current iy. A vertical rate parabola signal E-W is generated in a conventional way, not shown. Signal E-W is conventionally coupled to power supply 100 for producing a vertical rate parabola component of voltage B+ to provide for East-West distortion correction.

A switching circuit 60 is used for correcting a beam landing error such as linearity. Circuit 60 selectively couples none, only one or both of a trace or S-capacitor CS2 and a trace or S-capacitor CS3 in parallel with trace capacitor CS1. The selective coupling is determined as a function of the range of frequencies from which the horizontal scan frequency is selected. In switching circuit 60, capacitor CS2 is coupled between terminal 25 and a drain electrode of a field effect transistor (FET) switch Q2. A source electrode of transistor Q2 is coupled to ground GND. A protection resistor R2 that prevents excessive voltage across transistor Q2 is coupled across transistor Q2.

A register 201 applies switch control signals 60a and 60b. Control signal 60a is coupled via a buffer 98 to a gate electrode of transistor Q2. When control signal 60a is at a first selectable level, transistor Q2 is turned off. On the other hand, when control signal 60a is at a second selectable level, transistor Q2 is turned on. Buffer 98 provides the required level shifting of signal 60a to accomplish the above mentioned switching operation, in a conventional manner.

In switching circuit 60, capacitor CS3 is coupled between terminal 25 and a drain electrode of a FET switch Q2'. FET switch Q2' is controlled by control signal 60b in a similar way that FET switch Q2 is controlled by control signal 60a. Thus, a buffer 98' performs a similar function as buffer 98.

A microprocessor 208 is responsive to a data signal 209a generated in a frequency-to-data signal converter 209. Signal 209b has a numerical value that is indicative of the frequency of a synchronizing signal HORZ-SYNC or deflection current iy. Converter 209 includes, for example, a counter that counts the number of clock pulses, during a given period of signal HORZ-SYNC and generates word signal 209b in accordance with the number of clock pulses that occur in the given period. Microprocessor 208 generates a control data signal 208a that is coupled to an input of register 201. The value of signal 208a is determined in accordance with the horizontal rate of signal HORZ-SYNC. Register 201 generates, in accordance with data signal 208a, control signals 60a and 60b at levels determined by signal 208a, in accordance with the frequency of signal HORZ-SYNC. Alternatively, the value of signal 208a may be determined by a signal 109b that is provided by a keyboard, not shown.

When the frequency of horizontal deflection current iy is $1f_H$, transistors Q2 and Q2' are turned on. The result is that both S-capacitors CS2 and CS3 are in-circuit S-capacitors that are coupled in parallel with non-switched S-capacitor CS1 and establish a maximum S-capacitance value. When the frequency of horizontal deflection current iy is equal to or greater than $2 f_h$ and less than $2.14 f_h$, transistor Q2 is turned off and transistor Q2' is turned on. The result is that S-capacitor CS2 is decoupled from non-switched S-capacitor CS1 and S-capacitor CS3 is coupled to S-capacitor CS1 to establish an intermediate S-capacitance value. When the frequency of horizontal deflection current iy is equal to or greater than $2.14 f_h$, transistors Q2 and Q2' are turned off. The result is that S-capacitors CS2 and CS3 are decoupled from non-switched S-capacitor CS1 and establish a minimum S-capacitance value. Deflection current iy in capacitor CS1, CS2 or CS3 produces an S-shaping parabolic voltage V5.

The total retrace capacitance formed by capacitor 105 does not change at the different scan frequencies. Therefore, the retrace interval has the same length at the different scan frequencies. The values of capacitors CS1, CS2 and CS3 are selected to produce parabolic voltage V5 at different amplitudes at different scan frequencies. The different amplitudes of voltage V5 are required because the retrace interval length is constant.

Figure 1B:
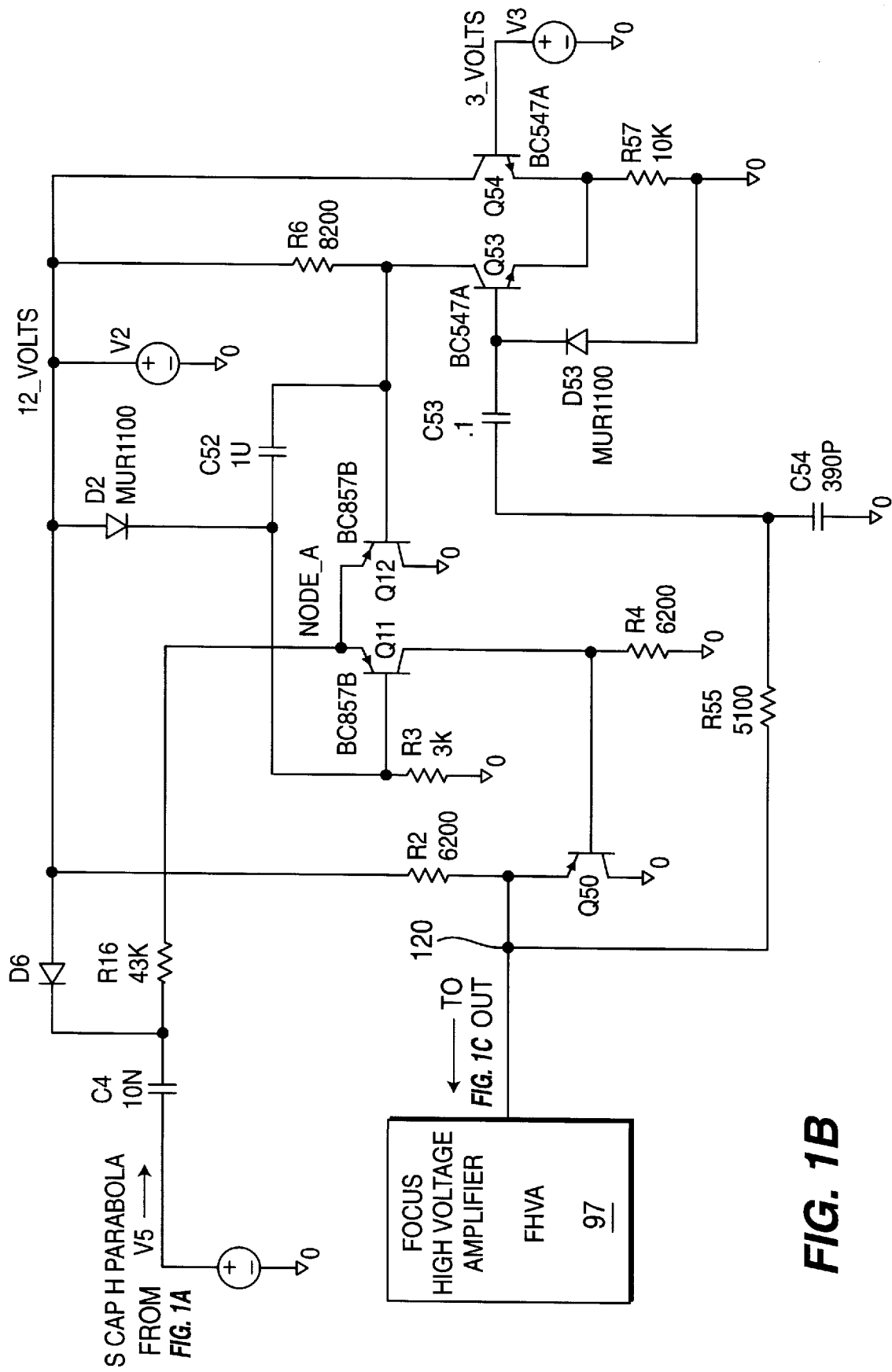
FIG. 1B illustrates an automatic gain circuit for controlling a horizontal parabola amplitude in accordance with an inventive feature.

FIG. 1B illustrates an automatic gain circuit for controlling the horizontal parabola amplitude, embodying an inventive feature. Similar symbols and numerals in FIGS. 1A and 1B indicates similar items or functions. Voltage V5 of FIG. 1A has negative going retrace peaks. The peak to peak amplitude of parabolic voltage V5 is about 60 V at 16 KHz or $1f_h$, 80 V at $2f_h$ and 125 V at $2.4f_h$. Parabola voltage V5 is capacitively coupled via a capacitor C4 to a resistor R16.

FIG. 1B shows the automatic gain circuit that controls the horizontal parabola amplitude, in accordance with an inventive feature. S-shaping parabolic voltage V5 is AC coupled through capacitor C4 and clamped at its negative peak to 12 volts by diode D6. At the cathode of diode D6, the parabola voltage is always positive with respect to 11.4 volts. Transistor Q11 has a constant 11.4 volts at its base and a constant 12 volt at its emitter.

The positive parabola voltage across resistor R16 provides a proportional parabola current to the emitters of Q 11 and Q12. Assuming transistor Q12 is not conducting, then this current passes through transistor Q11 and produces a voltage across resistor R4. This voltage is then buffered by emitter follower Q50 and appears at the output OUT.

The output voltage is also coupled through a low pass filter consisting of resistor R55 and capacitor C54. The values of resistor R55 and capacitor C54 are selected so that the low pass filtered voltage across capacitor C54 proportionally tracks the low pass response inherent in the focus high voltage amplifier (FHVA) 97 that is connected to output OUT.

The voltage across capacitor C54 is AC coupled through capacitor C53 and then negative peak clamped to ground by diode D53.

The differential amplifier pair consisting of transistors Q53 and Q54 acts as a voltage comparator that conducts current through transistor Q53 only when the base voltage of transistor Q53 exceeds the base voltage of Q54 which is a constant reference voltage of 3 volts. Current flow through transistor Q53 charges capacitor C52 until transistor Q12 conducts. Transistor Q12 then conducts a percentage of the parabola current flowing into node A to ground. The same percentage of the current into node A is conducted through transistor Q12 for all amplitudes of this current, therefore, the current in transistor Q11 is linearly reduced in magnitude.

The voltage across resistor R4 is reduced in amplitude without distortion of its parabola shape. As outlined above, a processed replica of the reduced voltage across resistor R4 also appears at the base of transistor Q53. This completes a voltage amplitude maintaining feedback loop. When this voltage at the base of transistor Q53 is reduced in amplitude sufficiently that transistor Q53 only conducts minimally to maintain a balance in the feedback loop, the amplitude of the voltage at the base of transistor Q53 will be only slightly greater than 3 volts and will be maintained nearly constant by the gain in the feedback loop.

The low pass filter consisting of resistor R55 and capacitor C54 is part of the loop. It will cause parabolas of higher frequencies such as those at 31 KHz or 38 KHz to be attenuated at the transistor Q53 base and amplified at the output OUT in such a manner that the high frequency attenuation inherent in amplifier FHVA 97 is compensated and a constant output from amplifier FHVA 97 is achieved for parabolas in all the different scan modes from 15 KHz to 38 Khz.

Figure 1C:
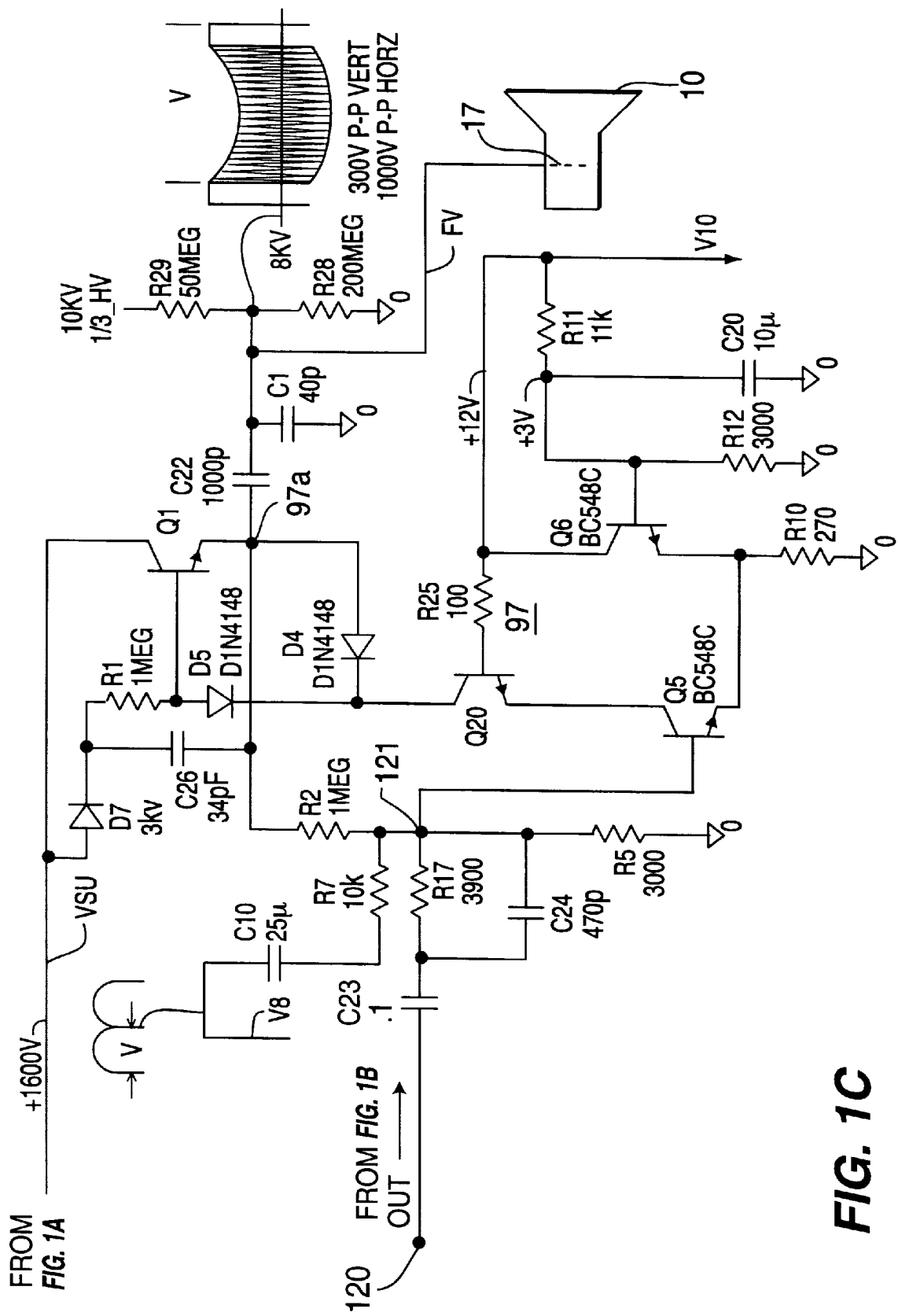
FIG. 1C illustrates a focus high voltage amplifier.

As shown in FIG. 1C, capacitor C23 provides capacitive coupling for the horizontal parabola to the Focus High Voltage Amplifier 97. A capacitor C10 capacitively couples a vertical parabola V8, produced in a conventional manner, not shown, to terminal 121. The direct current operating point of focus amplifier 97 is determined by a resistor R5 and not by the parabolic signals, because the capacitive coupling eliminates a direct current component. Capacitor C24 corrects a phase delay caused by a stray input capacitance, not shown, of amplifier 97 so that the horizontal focus correction is properly timed.

Referring to FIG. 1C, in amplifier 97, a transistor Q5 and a transistor Q6 are coupled to each other to form a differential input stage. These transistors have very high collector current-to-base current ratio, referred to as beta, to increase the input impedance at terminal 121. The base-emitter junction voltages of transistors Q5 and Q6 compensate each other and reduce direct current bias drift with temperature changes. Resistor R11 and resistor R12 form a voltage divider that is applied to a supply voltage V10 at +12 V for biasing the base voltage of transistor Q6 at about +3 V. The value of an emitter resistor R10 that is coupled to the emitters of transistors Q5 and Q6 is selected to conduct a maximum current of about 6 mA. This protects a high voltage transistor Q20. Transistor Q20 is coupled to transistor Q5 in a cascode configuration. Transistor Q20 needs to be protected from being over-driven because transistor Q20 can tolerate only up to 10 mA collector current. This is accomplished because amplifier 97 has high transconductance at a collector current of up to 6 mA and lower transconductance above 6 mA. The cascode configuration of transistors Q20 and Q5 isolates the Miller capacitance, not shown, across the collector-base junction of transistor Q20, thereby the bandwidth is increased. The cascode configuration also makes the amplifier gain independent of the low beta of high voltage transistor Q20.

A winding T0W3 of transformer T0 of FIG. 1A produces a stepped-up retrace voltage that is rectified in a diode D12 and filtered in a capacitor C13 to produce a supply voltage VSU for energizing dynamic focus voltage generator 99 of FIG. 1B. An active pull up transistor Q1 has a collector coupled to supply voltage VSU. A base pull-up resistor R1 of transistor Q1 is coupled to voltage VSU via a bootstrap or boosting arrangement that includes a diode D7 and a capacitor C26. A diode D5 is coupled in series with resistor R1 and is coupled to the collector of transistor Q20. A diode D4 is coupled between the emitter of transistor Q1 at terminal 97a and the collector of transistor Q20.

During the negative peaks of the output waveform at terminal 97a, diode D7 clamps an end terminal of capacitor C26 at the cathode of diode D7 to the +1600 V supply voltage VSU and transistor Q20 pulls the other end terminal of capacitor C16 to near ground potential. Transistor Q1 is held off by the actions of diodes D4 and D5. As the voltage at terminal 97a rises, the energy stored in capacitor C26 is fed through resistor R1 to the base of transistor Q1. The voltage across resistor R1 is maintained high, and base current in transistor Q1 also is maintained, even as the collector-to-emitter voltage across transistor Q1 approaches zero. Therefore, transistor Q1 emitter current is maintained. The output positive peak at terminal 97a can then be very near the +1600 V supply voltage VSU without distortion.

A capacitance C1 represents the sum of the stray capacitance of focus electrode 17 and of the wiring. Active pull-up transistor Q1 is capable of sourcing a current from terminal 97a to charge stray capacitance C1. Pull-down transistor Q20 is capable of sinking current via diode D4 from capacitance C1. Advantageously, the active pull up arrangement is used to obtain fast response time with lowered power dissipation. Amplifier 97 uses shunt feedback for the output at terminal 97a via a feedback resistor R2. Resistors R17 and R2 are selected to produce 1000 V peak to peak horizontal rate voltage at terminal 97a. As a result, the voltage gain of amplifier 97 is several hundred.

Dynamic focus voltage components at the horizontal rate produced by voltage V5 and at the vertical rate produced by voltage V8 are capacitively coupled via a direct current blocking capacitor C22 to a focus electrode 17 of a CRT 10 to develop a dynamic focus voltage FV. A direct current voltage component of voltage FV, developed by a voltage divider formed by a resistor R28 and a resistor R29, is equal to 8 KV.

What is claimed is:

1. A video imaging apparatus, comprising:

a cathode-ray tube including a focus electrode;

a source of a first parabolic signal at a frequency related to a deflection frequency, selected from a plurality of frequencies, having an amplitude determined in accordance with the selected frequency;

a control circuit comprising a voltage amplitude feedback loop having an input coupled to said source of said first parabolic signal for generating an output signal for maintaining said amplitude of said first parabolic signal for said plurality of deflection frequencies;

amplifier responsive to said output signal and coupled to said focus electrode for amplifying said parabolic signal to generate a dynamic focus voltage at said focus electrode, said voltage amplitude feedback loop further comprising a low pass filter selected to proportionally track the response of said amplifier to compensate the high frequency roll off of said amplifier.

* * * * *